(12) United States Patent
Maier

(10) Patent No.: US 10,208,653 B2
(45) Date of Patent: Feb. 19, 2019

(54) PRE-CHAMBER OF AN INTERNAL COMBUSTION ENGINE

(71) Applicant: Caterpillar Energy Solutions GmbH, Mannheim (DE)

(72) Inventor: Thomas Maier, Ladenburg (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 51 days.

(21) Appl. No.: 15/374,841

(22) Filed: Dec. 9, 2016

(65) Prior Publication Data

US 2017/0167359 A1 Jun. 15, 2017

(30) Foreign Application Priority Data

Dec. 14, 2015 (EP) .................................... 15199889

(51) Int. Cl.
*F02B 19/18* (2006.01)
*F02B 19/10* (2006.01)
(Continued)

(52) U.S. Cl.
CPC ............ *F02B 19/18* (2013.01); *F02B 19/108* (2013.01); *F02B 19/12* (2013.01);
(Continued)

(58) Field of Classification Search
CPC ...................................................... F02B 19/18
(Continued)

(56) References Cited

U.S. PATENT DOCUMENTS 4,294,208 A * 10/1981 Wagner .................. F02B 19/14
123/285
8,839,762 B1 9/2014 Chiera et al.
(Continued)

FOREIGN PATENT DOCUMENTS

DE 102014004943 A1 2/2015
EP 2927458 A1 10/2015
(Continued)

OTHER PUBLICATIONS

EP Search Report dated Jun. 30, 2016, issued in EP 15199889 (2 pages).

*Primary Examiner* — Joseph Dallo
*Assistant Examiner* — Yi-Kai Wang

(57) ABSTRACT

A pre-chamber body for an engine is disclosed. The pre-chamber body may have a pre-chamber. The pre-chamber body may also have flow transfer channels fluidly connecting the pre-chamber and an exterior of the pre-chamber body. Each flow transfer channel extends along a flow transfer channel axis (B) from an inner opening via a throat section to an outer opening. A cross-section of the flow transfer channels converges from a first cross section ($A_1$) of the inner opening to a second cross-section ($A_2$) of the throat section and diverges from the second cross-section ($A_2$) to a third cross-section ($A_3$) of the outer opening along the flow transfer channel axis (B). At least one of the inner opening and the outer opening has an oval shape with a maximum diameter ($a_1$, $a_3$) and a minimum diameter ($b_1$, $b_3$), the maximum diameter ($a_1$, $a_3$) being greater than the minimum diameter ($b_1$, $b_3$).

20 Claims, 4 Drawing Sheets

(51) Int. Cl.
*F02B 19/12* (2006.01)
*F02M 21/02* (2006.01)
*F02D 19/06* (2006.01)

(52) U.S. Cl.
CPC ..... *F02D 19/0642* (2013.01); *F02M 21/0275* (2013.01); *Y02T 10/125* (2013.01); *Y02T 10/36* (2013.01)

(58) Field of Classification Search
USPC ........................................................ 123/293
See application file for complete search history.

(56) References Cited

U.S. PATENT DOCUMENTS

| | | | | |
|---|---|---|---|---|
| 2010/0320293 | A1* | 12/2010 | Ogura | ................ F02M 51/0685 239/533.12 |
| 2010/0326400 | A1 | 12/2010 | Hayes, Jr. | |
| 2012/0312900 | A1* | 12/2012 | Hashii | ................ F02M 51/0671 239/533.2 |
| 2013/0055986 | A1* | 3/2013 | Tozzi | ..................... F02B 19/12 123/254 |
| 2013/0333667 | A1* | 12/2013 | Ishida | ...................... F01L 3/08 123/445 |
| 2014/0261296 | A1 | 9/2014 | Sotiropoulou et al. | |
| 2015/0047611 | A1* | 2/2015 | Yasukawa | .......... F02M 51/0671 123/445 |
| 2018/0073045 | A1* | 3/2018 | Wang | ....................... C12P 7/56 |

FOREIGN PATENT DOCUMENTS

| | | |
|---|---|---|
| JP | 57-66223 | 4/1982 |
| JP | 2014-129788 | 7/2014 |
| RU | 2270349 C2 | 7/2005 |
| WO | WO 2013/041289 A1 | 3/2013 |
| WO | WO 2014/094808 A1 | 6/2014 |
| WO | WO2014094808 A1 * | 6/2014 |
| WO | WO 2014094808 A1 * | 6/2014 ............. F02B 19/18 |

* cited by examiner

PRE-CHAMBER OF AN INTERNAL COMBUSTION ENGINE

CLAIM FOR PRIORITY

This application claims benefit of priority of European Patent Application No. EP 15199889.5, filed Dec. 14, 2015, which is incorporated herein by reference.

TECHNICAL FIELD

The present disclosure generally relates to an internal combustion engine, and more particularly to a pre-chamber body of an internal combustion engine.

BACKGROUND

Gaseous fuel internal combustion engines powered with a lean mixture of gaseous fuel and air may comprise a pre-combustion chamber (also referred to as pre-chamber) per cylinder for ignition purposes. Particularly, large-bore engines may benefit from those pre-chambers as it is otherwise difficult to consistently achieve complete and thorough combustion using lean fuel air mixtures.

Typically, such a pre-chamber is fluidly connected to a main combustion chamber of a respective cylinder via a riser channel and a plurality of flow transfer channels. The flow transfer channels and the riser channel allow the flow of the lean mixture of gaseous fuel and air from the main combustion chamber into the pre-chamber during a compression stroke. Enrichment of the lean mixture in the pre-chamber may be effected by providing a small quantity of (gaseous) fuel into the pre-chamber via a separate fuel feed passage, for example during the intake stroke. The enriched mixture is ignited in the pre-chamber by an igniter such as a spark plug. The ignition of the enriched mixture causes a flame front of hot gases that propagates from the pre-chamber via the flow transfer channels into the main combustion chamber. Thus, the lean mixture in the main combustion chamber ignites and burns, and thereby, expands against a movable piston that drives a crankshaft.

For example, JP 2014-129788 (A) discloses a pre-combustion chamber type gas engine. Here, the pre-combustion chamber type gas engine includes a pre-combustion chamber and a main combustion chamber that are in communication with each other through an injection hole disposed on a pre-combustion chamber cap. A combustion flame generated in the pre-combustion chamber is injected into the main combustion chamber through the injection hole so as to combust mixed air inside the main combustion chamber. The injection hole has a diameter that decreases gradually from an inlet into which the combustion flame flows toward a throat section having an opening diameter that is smaller than an opening diameter of the inlet, and has a Laval nozzle shape whose diameter gradually increases from the throat section toward an outlet from which the combustion flame flows out.

The present disclosure is directed, at least in part, to improving or overcoming one or more aspects of prior systems.

SUMMARY OF THE DISCLOSURE

In one aspect, the present disclosure relates to a pre-chamber body for a gaseous fuel internal combustion engine. The pre-chamber body may comprise a pre-chamber, and a plurality of flow transfer channels fluidly connecting the pre-chamber and an exterior of the pre-chamber body. Each flow transfer channel may extend along a flow transfer channel axis from an inner opening via a throat section to an outer opening. A cross-section of the flow transfer channels may converge from a first cross section of the inner opening to a second cross-section of the throat section, and diverges from the second cross-section to a third cross-section of the outer opening along the flow transfer channel axis. At least one of the inner opening and the outer opening may have an oval shape with a maximum diameter and a minimum diameter. The maximum diameter may be greater than the minimum diameter.

Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure. In the drawings.

DETAILED DESCRIPTION

Figure 1:
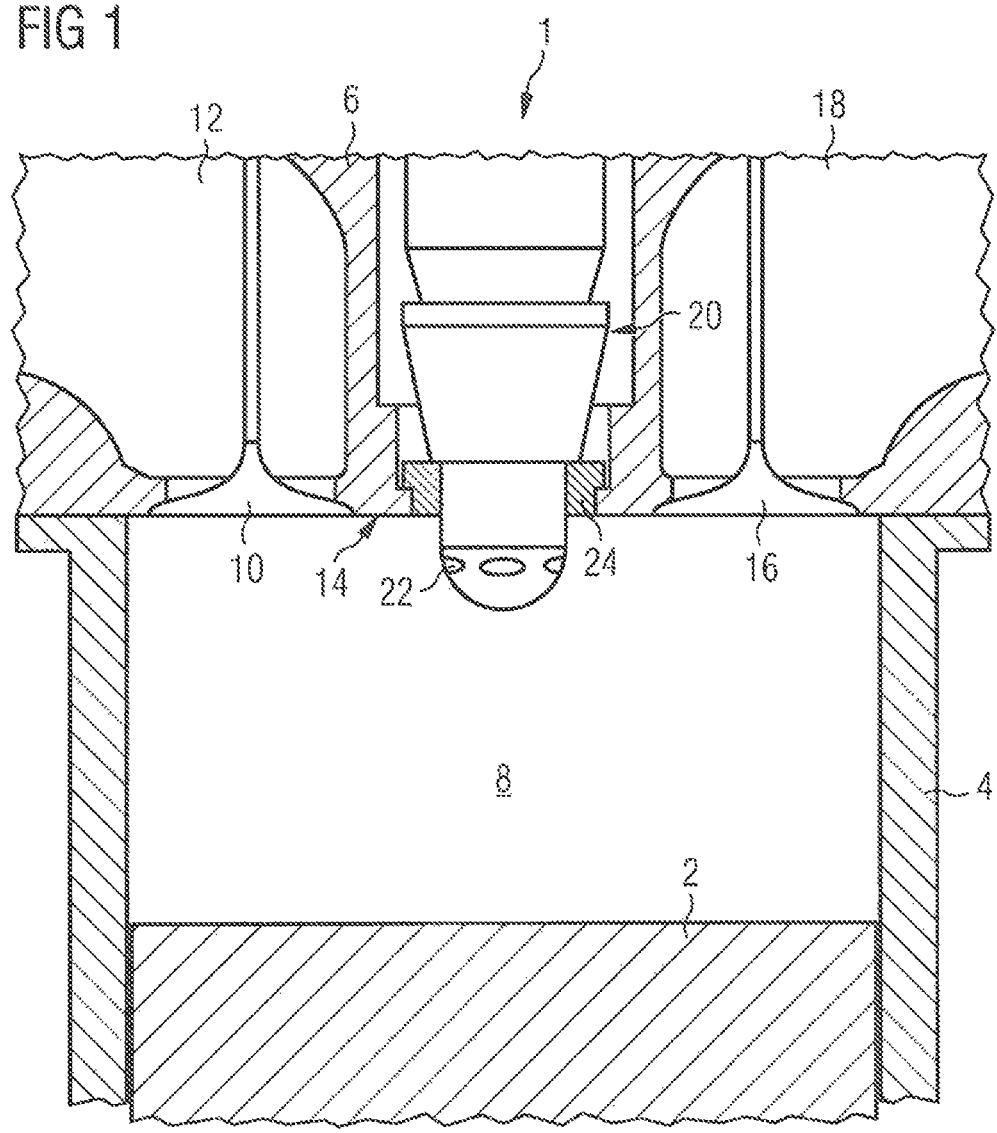
FIG. 1 shows a schematic cut view through a portion of an internal combustion engine that is equipped with a pre-chamber body according to the present disclosure.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The present disclosure is based in part on the realization that flow transfer channels of a pre-chamber body configured as converging-diverging nozzles, particularly de Laval nozzles, can be optimized with respect to the geometry by departing from a conventional converging-diverging nozzle shape with circular cross-sections. Particularly, herein it is proposed to include oval inner openings of the flow transfer channels to positively influence a flow into and out of the flow transfer channels, and to increase the stability of the pre-chamber body. Additionally or alternatively, the flow transfer channels may include oval outer openings to broaden a flame jet into the main combustion chamber of the internal combustion engine. Different orientations of the inner openings and the outer openings may allow to obtain the converging-diverging design without substantially increasing the space requirements.

Referring now to the drawings to explain the general principle of the present disclosure by way of example. FIG. 1 depicts a piston 2 arranged in a cylinder 4 of a portion of an internal combustion engine 1 (not shown in further detail). The cylinder 4 is covered by a cylinder head 6. The piston 2, the cylinder 4, and the cylinder head 6 together define a main combustion chamber 8 of the internal combustion engine 1. The piston 2 is reciprocatingly arranged in the cylinder 4 to move between a top dead center (TDC) and a bottom dead center (BDC) during operation of the internal combustion engine 1.

For the purpose of describing exemplary embodiments of the present disclosure, the internal combustion engine 1 is considered as a four-stroke stationary or marine internal combustion engine operating at least partly on gaseous fuel such as a gaseous fuel engine or a dual fuel engine. One skilled in the art will appreciate, however, that the internal combustion engine may be any type of engine (turbine, gas, diesel, natural gas, propane, two-stroke, etc.) that would utilize the pre-chamber assembly as disclosed herein. Furthermore, the internal combustion engine may be of any size, with any number of cylinders, and in any configuration (V-type, in-line, radial, etc.). Moreover, the internal combustion engine may be used to power any machine or other device, including locomotive applications, on-highway trucks or vehicles, off-highway trucks or machines, earth moving equipment, generators, aerospace applications, marine applications, pumps, stationary equipment, or other engine powered applications.

The cylinder head 6 includes at least one inlet valve 10, for example a poppet valve. The inlet valve 10 is accommodated in an inlet channel 12 opening in a piston sided face 14 of the cylinder head 6 for supplying a lean mixture of gaseous fuel and air into the main combustion chamber 8. Similarly, at least one outlet valve 16, for example also a poppet valve, is accommodated in an outlet channel 18 of the cylinder head 6 to guide exhaust gas out of the main combustion chamber 8.

The cylinder head 6 further comprises a pre-chamber assembly 20. A plurality of flow transfer channels 22 fluidly connect the main combustion chamber 8 with an interior of the pre-chamber assembly 20 (not visible in FIG. 1).

The pre-chamber assembly 20 is installed in the cylinder head 6 via a mounting body 24 as shown in FIG. 1. Alternatively, the pre-chamber assembly 20 may be installed in the cylinder head 6 in any other fashion.

Figure 2:
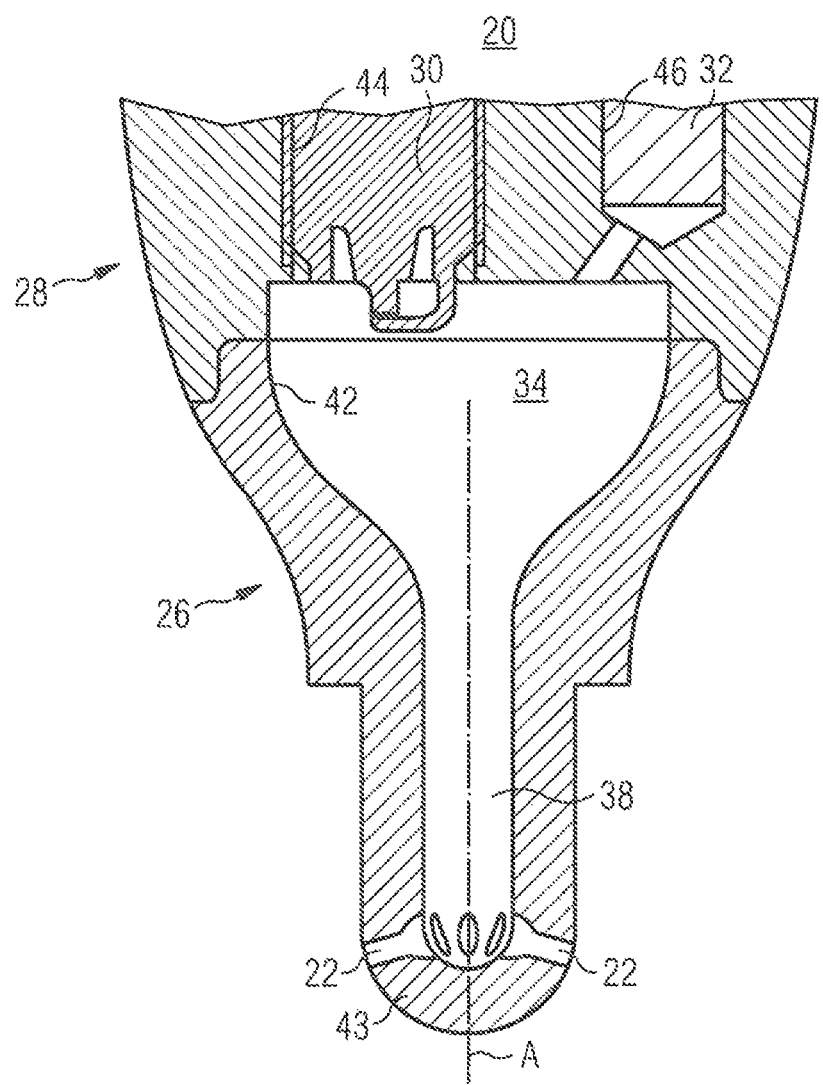
FIG. 2 shows a schematic cut view through an exemplary pre-chamber assembly according to the present disclosure.

Referring to FIG. 2, a first embodiment of a pre-chamber assembly 20 is shown in a schematic sectional view.

The pre-chamber assembly 20 includes a first pre-chamber body 26, a second pre-chamber body 28, an ignition device 30, and a fuel supply device 32. The first pre-chamber body 26 and the second pre-chamber body 28 are connected to one another. The ignition device 30 and the fuel supply device 32 are accommodated in the second pre-chamber body 28

The first pre-chamber body 26 includes and defines a pre-chamber 34, a riser channel 38 and the flow transfer channels 22. In an assembled state, the flow transfer channels 22 fluidly connect an interior of the pre-chamber body 26 (the pre-chamber 34 and the riser channel 38) and the main combustion chamber 8 (FIG. 1).

As can be seen in FIG. 2, a diameter of the pre-chamber 34 is greater than a diameter of the riser channel 38 which in turn is greater than a diameter of the flow transfer channels 22

The pre-chamber 34 extends along a longitudinal axis A of the first pre-chamber body 26, is funnel-shaped, and tapers in direction to the riser channel 38. Alternatively, the pre-chamber 34 may have any other shape such as a cylindrical shape, pyramidal shape, conical shape, and combinations thereof. For example, the pre-chamber 34 may have a volume within a range between 0.1% and 10% of the compression volume of the cylinder 4 (see FIG. 1).

A bottom section of the pre-chamber 34 smoothly transitions into the riser channel 38. The riser channel 38 longitudinally extends in the first pre-chamber body 26, and opens with one end in the pre-chamber 34. In the shown configuration of FIG. 2, the riser channel 38 is aligned with the pre-chamber longitudinal axis A. Alternatively, the riser channel 38 may run parallel to the pre-chamber longitudinal axis A, or may confine an angle with the pre-chamber longitudinal axis A. The riser channel 38 fluidly connects the pre-chamber 34 and the flow transfer channels 22.

To fluidly connect a bottom section of the riser channel 38 and a top section of the main combustion chamber 8 (see FIG. 1), the flow transfer channels 22 are provided. The flow transfer channels 22 extend through a tip portion 43 of the first pre-chamber body 26.

In some embodiments, the flow transfer channels 22 may directly open in the pre-chamber 34. In other words, a riser channel fluidly interconnected between the pre-chamber and the flow transfer channels may be omitted.

The ignition device 30, for example a spark plug, a laser or plasma igniter, an ignition fuel injector, or a glow plug, is installed in the pre-chamber assembly 20 so that the ignition device 30 is operably coupled to the pre-chamber 34.

As used herein, "operably coupled" means that the ignition device 30 is—depending on its ignition mechanism—configured and arranged to ignite an ignitable mixture in the pre-chamber 34. For example, in case the ignition device 30 is a spark plug, the same may extend into the pre-chamber 34. Specifically, electrodes of the spark plug may reach into the pre-chamber 34 so that a spark between the electrodes ignites a mixture in the pre-chamber 34. As another example, in case the ignition device 30 is a laser igniter, the same may be separated from the pre-chamber 34 via a window that is configured to transmit a laser beam from the laser igniter into the pre-chamber 34.

In case the ignition device 30 is configured as an igniter that reaches into the pre-chamber 34 (as is exemplary shown in FIG. 2), the ignition device 30 may be mounted in the first or second pre-chamber body 26, 28 to extend through an ignition device bore 44.

The fuel supply device 32 is mounted in a fuel supply bore 46 extending through the second pre-chamber body 28. Alternatively, the fuel supply device 32 may be mounted in the first pre-chamber body 26. The fuel supply device 32 is configured to supply a fuel, for example a gaseous fuel, or a rich mixture of fuel and air to the pre-chamber 34 for enriching the same.

Figure 3:
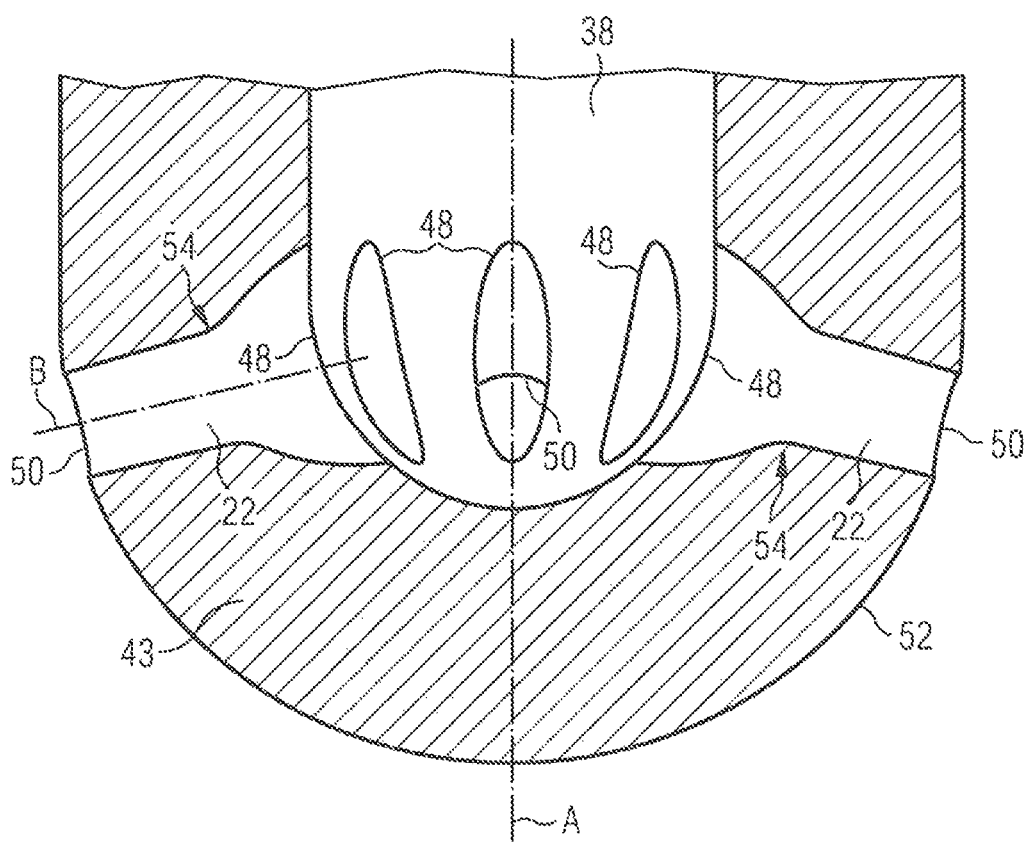
FIG. 3 shows a schematic cut view through a tip portion of the exemplary pre-chamber body according to the present disclosure.

Referring to FIG. 3, the tip portion 43 of the first pre-chamber body 26 is shown in more detail in a cut view. As can be seen, the flow transfer channels 22 extend along flow transfer channel axes B (only one is shown in FIG. 3) from inner openings 48 to outer openings 50.

The inner openings 48 are disposed in a bottom section of the riser channel 38. Alternatively, the inner openings 48 may be disposed in the pre-chamber 34, for example in embodiments without a riser channel.

In the shown embodiment, the inner openings 48 have an oval shape, particularly an elliptic shape. Alternatively, the inner openings 48 may have another shape as is discussed in more detail with reference to FIG. 4.

The outer openings 50 are disposed in an outer face 52 of the tip portion 43, which faces the main combustion chamber 8 in an assembled state (see FIG. 1).

The flow transfer channels 22 are configured as converging-diverging nozzles with throat sections 54. Specifically, the flow transfer channels 22 converge from the inner openings 48 to the throat sections 54 of the flow transfer channels 22, and diverge from the throat sections 54 to the outer openings 50 along the flow transfer channel axes B. The throat section 54 of the flow transfer channel 22 refers to a portion having a minimum flow cross-section of the flow transfer channel 22. It should be noted that in the embodiment shown in FIG. 3, the divergence in cross-sections from the throat sections 54 to the outer openings 50 is not visible, because the flow transfer channels 22 diverge in a direction into and out of the paper plane of FIG. 3 in a section between the throat section 54 and the outlet openings 50.

In some embodiments, the flow transfer channels 22 smoothly converge from a cross-section of the inner openings 48 to a cross-section of the throat sections 54 along the flow transfer channel axes B. Additionally or alternatively, the flow transfer channels 22 smoothly diverge from a cross-section of the throat sections 54 to the outer openings 50 along the flow transfer channel axes B.

In some embodiments, the flow transfer channels 22 are configured as de Laval nozzles. As one skilled in the art will appreciate, adapting the flow transfer channels 22 as de Laval nozzles may not necessarily result in a supersonic flow at an exit of the flow transfer channels 22, because the flow acceleration further depends, for example, on the specific operating point and associated conditions of the engine.

Figure 4:
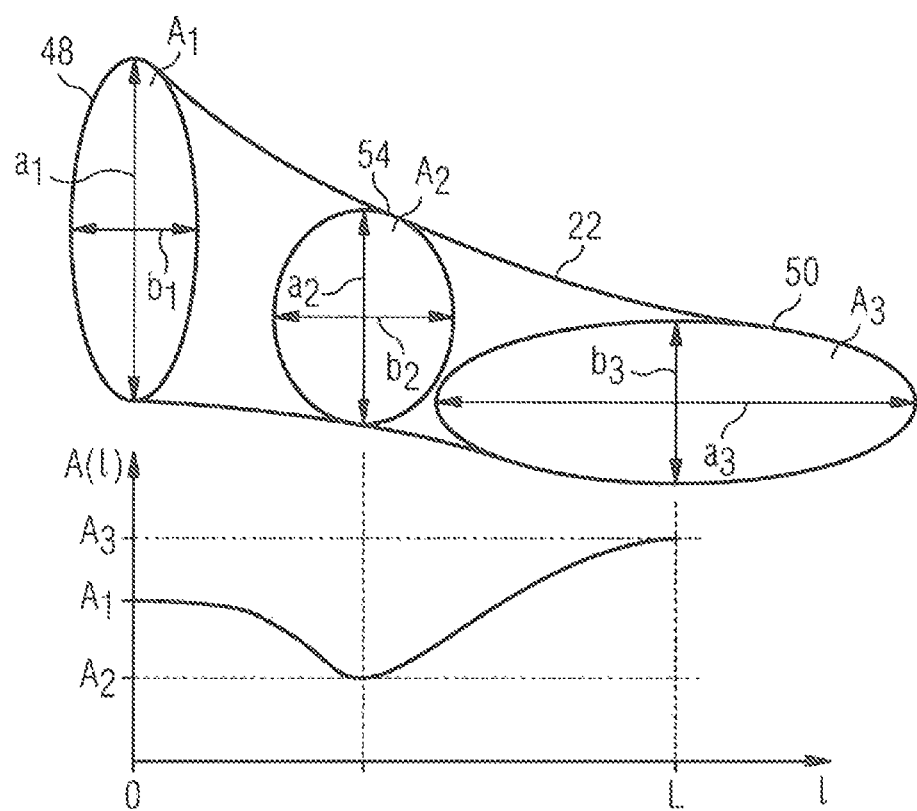
FIG. 4 shows a schematic illustration of different cross-sections of a flow transfer channel along its length.

Referring to FIG. 4, a development of cross sections of one flow transfer channel 22 along the flow transfer channel axis B (see FIG. 3) is schematically illustrated.

Here, it can be seen, that the (flow) cross-section of the flow transfer channel 22 converges from the inner opening 48 to the throat section 54 along a length l of the flow transfer channel 22, and diverges from the throat section 54 to the outer opening 50 along a length l of the flow transfer channel 22 until an end at L referring to a total length of the flow transfer channel 22.

Specifically, the inner opening 48 has a first cross-sectional area $A_1$, a maximum width or diameter $a_1$, and a minimum width or diameter $b_1$. The throat section 54 has a second cross-sectional area $A_2$, a (maximum) width or diameter $a_2$, and a (minimum) width or diameter $b_2$. The diameters $a_2$ and $b_2$ are measured in a plane perpendicular to the flow transfer channel axis B of the respective flow transfer channel 22. Lastly, the outer opening 50 has a third cross-sectional area $A_3$, a maximum width or diameter $a_3$, and a minimum width or diameter $b_3$.

In the shown embodiment, the inner opening 48 and the outer opening 50 have an oval shape, specifically an elliptic shape, and the throat section has a circular shape. Alternatively, either the inner opening 48 or the outer opening 50 may have an oval shape, and the throat section 54 may have an oval shape, particularly an elliptic shape. For example, either the inner opening 48 or the outer opening 50 may have a circular shape.

The inner opening 48 and the outer opening 50 have a different orientation. Specifically, the inner opening 48 is oriented such that the minimum diameter $b_1$ lies in a plane substantially perpendicular to the pre-chamber longitudinal axis A. And the outer opening 50 is oriented such that the maximum diameter $a_3$ lies in a plane substantially perpendicular to the pre-chamber longitudinal axis A (see FIGS. 2 and 3). By providing different orientations for the inner openings 48 and the outer openings 50, the converging-diverging configuration, particularly the de Laval nozzle configuration, of the flow transfer channel 22 can be particularly obtained by converging the maximum diameter $a_1$ of the inner opening 48 into diameter $a_2$ of the throat section 54, and by diverging the diameter $b_2$ of the throat section 54 into the maximum diameter $a_3$ of the outer opening 50.

In some embodiments, a ratio between the maximum diameter $a_1$ of the inner openings 48 and the minimum diameter $b_1$ of the inner openings 48 may be within a range between 1 and 30, particularly between 1.5 and 10, more particularly between 2 and 4. A ratio between the maximum diameter $a_3$ of the outer openings 50 and the minimum diameter $b_3$ of the outer openings 50 may be within a range between 1 and 30, particularly between 1.5 and 10, more particularly between 2 and 4. According to an aspect of the disclosure, a ratio between the minimum diameter ($b_3$) of the outer openings and the maximum diameter ($a_3$) of the outer openings is within a range between 0.03 and 1. Lastly, a ratio between the minimum diameter $b_2$ of the throat section 54 and the maximum diameter $a_2$ of the throat section 54 may be within a range between 0.5 and 2, particularly between 0.8 and 1.25. As one skilled in the art will appreciate, a ratio of 1 is obtained in embodiments with circular-shaped inner openings 48, throat sections 54 and outer openings 50, respectively.

It should be noted that cross-sections of the flow transfer channels 22 situated between the inner openings 48 and the throat sections 54, and between the throat sections 54 and to the outer openings 50, respectively, may deviate from a circular shape as the cross-sections $A_1$, $A_2$, $A_3$ transform, particularly smoothly transform, into each other along the length l or the flow transfer channel axis B.

The flow transfer channels 22 may be configured so that a ratio between the total length L of the flow transfer channels 22 and a maximum or minimum diameter $a_2$ or $b_2$ of the throat section 54 may be within a range between 1 and 6.

INDUSTRIAL APPLICABILITY

The pre-chamber body 26 as exemplary disclosed herein is particularly applicable in gaseous fuel internal combustion engines running on a lean mixture of gaseous fuel and air. However, as one skilled in the art will appreciate, the pre-chamber body 26 including the flow transfer channels 22 as described herein may be used in other engine configurations and types as well.

The flow transfer channel configuration as described provides a series of advantages, some of which are specifically described hereinbelow.

The oval or elliptical shape of the inner openings 48 improves the inflow from the riser channel 38 (or the pre-chamber 34) into the flow transfer channels 22.

Furthermore, the oval or elliptical shape of the inner openings 48 in an orientation as shown in FIGS. 3 and 4 allow to increase a clearance between the inner openings 48 to strengthen the tip portion 43 of the first pre-chamber body 26. For example, the oval or elliptical shape of the inner openings 48 may allow to provide a ratio between a minimum clearance between neighboring inner openings 48, and a wall thickness of the tip portion 43 within a range between 0.2 and 0.5. According to an aspect of the disclosure, a ratio between a minimum clearance between neighboring inner openings 48, and a wall thickness of a tip portion 43 of the pre-chamber body is within a range between 0.1 and 0.5.

Additionally, the oval or elliptical shape of the outer openings 50 in an orientation as shown in FIGS. 3 and 4 allow to provide broad flame jets into the main combustion chamber 8, which improves ignition and combustion therein.

The (smooth) transition between different shapes and/or orientations of the inner opening 48 and the throat section 54, and/or the throat section 54 and the outer opening 50 allows including a converging-diverging configuration, particularly a de Laval configuration, into the flow transfer channels 22 without substantially weakening the structure while obtaining above noted advantages.

Furthermore, it was found that the ratio ranges given herein with respect the dimensional relationships, for example $a_1/b_1$, $a_2/b_2$, and $a_3/b_3$, are particularly suitable for adapting a conventional de Laval nozzle shape with circular cross-sections into a modified de Laval nozzle shape with oval (elliptic) cross-sections.

The pre-chamber body 26 and/or 28 may be fabricated by drilling, eroding, casting, 3D sintering, 3D printing (additive manufacturing) and/or other suitable methods known in the art.

The challenging design of the flow transfer channels with oval inner openings 48, oval outer openings 50, and different orientations of the oval shapes may be particularly suitable for being fabricated by a 3D printing process.

A 3D printing process for manufacturing the pre-chamber body 26 and/or 28 may include, among others, fused deposition modeling (FDM), fused filament fabrication (FFF), robocasting, direct ink writing (DIW), stereolithography (SLA), digital light processing (DLP), powder bed and inkjet head 3D printing (3DP, electron-beam melting (EBM), selective laser melting (SLM), selective heat sintering (SHS), selective laser sintering (SLS), direct metal laser sintering (DMLS), laminated object manufacturing (LOM), and/or electron beam freeform fabrication (EBF3).

Terms such as "about", "around", "approximately", or "substantially" as used herein when referring to a measurable value such as a parameter, an amount, a temporal duration, and the like, is meant to encompass variations of ±10% or less, preferably ±5% or less, more preferably ±1% or less, and still more preferably ±0.1% or less of and from the specified value, insofar as such variations are appropriate to perform in the disclosed invention. It is to be understood that the value to which the modifier "about" refers is itself also specifically, and preferably, disclosed. The recitation of numerical ranges by endpoints includes all numbers and fractions subsumed within the respective ranges, as well as the recited endpoints.

Although the preferred embodiments of this invention have been described herein, improvements and modifications may be incorporated without departing from the scope of the following claims.

The invention claimed is:

1. A pre-chamber body for an engine, the pre-chamber body comprising:
   an interior surface defining a pre-chamber;
   an exterior surface facing away from the interior surface, and
   a plurality of flow transfer channels fluidly connecting the pre-chamber and an exterior of the pre-chamber body, wherein:
   each flow transfer channel of the plurality of flow transfer channels extends along a flow transfer channel axis (B) from an inner opening defined by the interior surface to an outer opening defined by the exterior surface via a throat section;
   a cross-sectional area of each flow transfer channel converges from a first cross-sectional area ($A_1$) of the inner opening to a second cross-sectional area ($A_2$) of the throat section, and diverges from the second cross-sectional area ($A_2$) to a third cross-sectional area ($A_3$) of the outer opening along the flow transfer channel axis (B);
   the inner opening has a first oval shape with a maximum diameter ($a_1$) and a minimum diameter ($b_1$), the maximum diameter ($a_1$) of the inner opening being greater than the minimum diameter ($b_1$) of the inner opening;
   the outer opening has a second oval shape with a maximum diameter ($a_3$) and a minimum diameter ($b_3$), the maximum diameter ($a_3$) of the outer opening being greater than the minimum diameter ($b_3$) of the outer opening; and
   a rotational orientation of the maximum diameter ($a_1$) of the inner opening about the flow transfer channel axis (B) is different from a rotational orientation of the maximum diameter ($a_3$) of the outer opening about the flow transfer channel axis (B).

2. The pre-chamber body of claim 1, wherein each flow transfer channel is configured as a de Laval nozzle.

3. The pre-chamber body of claim 1, wherein each flow transfer channel smoothly converges from the first cross-sectional area ($A_1$) to the second cross-sectional area ($A_2$) along the flow transfer channel axis (B).

4. The pre-chamber body of claim 1, wherein the throat section has a third oval shape with a maximum diameter ($a_2$) and a minimum diameter ($b_2$), the maximum diameter ($a_2$) and the minimum diameter ($b_2$) of the throat section each lying in a throat section plane that is perpendicular to the flow transfer channel axis (B), and
   a rotational orientation of the maximum diameter (a2) of the throat section about the flow transfer channel axis (B) is different from the rotational orientation of the maximum diameter (a1) of the inner opening about the flow transfer channel axis (B).

5. The pre-chamber body of claim 1, wherein the minimum diameter ($b_1$) of the inner opening lies in a plane that is substantially perpendicular to a longitudinal axis (A) of the pre-chamber body.

6. The pre-chamber body of claim 1, wherein the maximum diameter ($a_3$) of the outer opening lies in a plane that is substantially perpendicular to a longitudinal axis (A) of the pre-chamber body.

7. The pre-chamber body of claim 1, wherein at least one of the inner opening and the outer opening has an elliptic shape.

8. The pre-chamber body of claim 1, wherein the throat section has a substantially circular shape.

9. The pre-chamber body of claim 1, wherein a ratio between the maximum diameter ($a_1$) of the inner opening and the minimum diameter ($b_1$) of the inner opening is within a range between 1.5 and 30.

10. The pre-chamber body of claim 1, wherein a ratio between the minimum diameter ($b_3$) of the outer opening and the maximum diameter ($a_3$) of the outer opening is within a range between 0.03 and 1.

11. The pre-chamber body of claim 1, wherein a ratio between a minimum diameter ($b_2$) of the throat section and a maximum diameter ($a_2$) of the throat section is within a range between 0.5 and 1.

12. The pre-chamber body of claim 1, wherein a ratio between a minimum clearance between neighboring inner openings, and a wall thickness of a tip portion of the pre-chamber body is within a range between about 0.1 and 0.5.

13. The pre-chamber body of claim 1, wherein the pre-chamber body has a longitudinal axis (A), and the plurality of flow transfer channels is arranged in a circumferential direction about the longitudinal axis (A).

14. The pre-chamber body of claim 1, manufactured by a 3 D printing process.

15. The pre-chamber body of claim 1, wherein each flow transfer channel smoothly diverges from the second cross-sectional area ($A_2$) to the third cross-sectional area ($A_3$) along the flow transfer channel axis (B).

16. An engine, comprising:
a cylinder;
a cylinder head covering the cylinder;
a combustion chamber defined at least partly by the cylinder and the cylinder head; and
a pre-chamber body disposed at least partially within the combustion chamber, the pre-chamber body including:
an interior surface defining a pre-chamber;
an exterior surface facing away from the interior surface; and
a plurality of flow transfer channels fluidly connecting the pre-chamber and an exterior of the pre-chamber body, wherein:
each flow transfer channel of the plurality of flow transfer channels extends along a flow transfer channel axis (B) from an inner opening defined by the interior surface to an outer opening defined by the exterior surface via a throat section;
a cross section cross-sectional area of each flow transfer channel converges from a first cross-sectional area ($A_1$) of the inner opening to a second cross-sectional area ($A_2$) of the throat section, and diverges from the second cross-sectional area ($A_2$) to a third cross-sectional area ($A_3$) of the outer opening along the flow transfer channel axis (B);
the inner opening has a first oval shape with a maximum diameter ($a_1$) and a minimum diameter ($b_1$), the maximum diameter ($a_1$) of the inner opening being greater than the minimum diameter ($b_1$) of the inner opening;
the outer opening has a second oval shape with a maximum diameter ($a_3$) and a minimum diameter ($b_3$), the maximum diameter ($a_3$) of the outer opening being greater than the minimum diameter ($b_3$) of the outer opening; and
a rotational orientation of the maximum diameter ($a_1$) of the inner opening about the flow transfer channel axis (B) is different from a rotational orientation of the maximum diameter ($a_3$) of the outer opening about the flow transfer channel axis (B).

17. The pre-chamber body of claim 1, wherein the minimum diameter ($b_1$) of the inner opening lies in a first plane that is substantially perpendicular to a longitudinal axis (A) of the pre-chamber body, and
wherein the maximum diameter ($a_3$) of the outer opening lies in a second plane that is substantially perpendicular to the longitudinal axis (A) of the pre-chamber body.

18. The engine of claim 16, wherein the minimum diameter ($b_1$) of the inner opening lies in a plane that is substantially perpendicular to a longitudinal axis (A) of the pre-chamber body.

19. The engine of claim 16, wherein the maximum diameter ($a_3$) of the outer opening lies in a plane that is substantially perpendicular to a longitudinal axis (A) of the pre-chamber body.

20. The engine of claim 16, wherein the minimum diameter ($b_1$) of the inner opening lies in a first plane that is substantially perpendicular to a longitudinal axis (A) of the pre-chamber body, and
wherein the maximum diameter ($a_3$) of the outer opening lies in a second plane that is substantially perpendicular to the longitudinal axis (A) of the pre-chamber body.

* * * * *